(12) United States Patent
Schauder

(10) Patent No.: US 11,500,862 B2
(45) Date of Patent: Nov. 15, 2022

(54) OBJECT RELATIONAL MAPPING WITH A SINGLE DATABASE QUERY

(71) Applicant: Pivotal Software, Inc., Palo Alto, CA (US)

(72) Inventor: Jens Schauder, Braunschweig (DE)

(73) Assignee: Pivotal Software, Inc., Palo Alto, CA (US)

(*) Notice: Subject to any disclaimer, the term of this patent is extended or adjusted under 35 U.S.C. 154(b) by 18 days.

(21) Appl. No.: 16/937,454

(22) Filed: Jul. 23, 2020

(65) Prior Publication Data

US 2022/0027358 A1   Jan. 27, 2022

(51) Int. Cl.
| | | |
|---|---|---|
| G06F 16/00 | (2019.01) | |
| G06F 16/23 | (2019.01) | |
| G06F 16/22 | (2019.01) | |
| G06F 16/901 | (2019.01) | |
| G06F 16/2455 | (2019.01) | |
| G06F 16/248 | (2019.01) | |
| G06F 16/28 | (2019.01) | |

(52) U.S. Cl.
CPC ...... *G06F 16/2393* (2019.01); *G06F 16/2282* (2019.01); *G06F 16/248* (2019.01); *G06F 16/2456* (2019.01); *G06F 16/288* (2019.01); *G06F 16/9024* (2019.01)

(58) Field of Classification Search
CPC .............. G06F 16/2393; G06F 16/2282; G06F 16/2456; G06F 16/288; G06F 16/248; G06F 16/9024

USPC ........................... 707/600–899; 715/200–867
See application file for complete search history.

(56) References Cited

U.S. PATENT DOCUMENTS

| | | | |
|---|---|---|---|
| 6,947,950 B2 * | 9/2005 | Murthy | .................... G06F 16/10 |
| 10,515,075 B2 * | 12/2019 | Ramachandra | ... G06F 16/90335 |
| 2007/0185833 A1 * | 8/2007 | Turkel | ................... G06F 16/283 |
| 2007/0219951 A1 * | 9/2007 | Ahmed | ............. G06F 16/24544 |
| 2007/0250524 A1 * | 10/2007 | Le | ........................ G06F 16/2433 |
| 2012/0084325 A1 * | 4/2012 | Bansode | ........... G06F 16/24556 |
| | | | 707/792 |
| 2014/0067789 A1 * | 3/2014 | Ahmed | ............. G06F 16/24544 |
| | | | 707/E17.017 |
| 2018/0018383 A1 * | 1/2018 | Brunel | .................. G06F 16/282 |
| 2018/0357279 A1 * | 12/2018 | Park | .................. G06F 16/24542 |

* cited by examiner

*Primary Examiner* — Michelle N Owyang
(74) *Attorney, Agent, or Firm* — Fish & Richardson P.C.

(57) ABSTRACT

Methods, systems, and apparatus, including computer programs encoded on computer storage media, for generating an object graph from records of a relational database. One of the methods includes receiving a request to populate a software object with values from a plurality of tables represented in a graph, the plurality of tables stored in a relational database maintained by a database management system, each table comprising one or more respective tuples of values; generating a single query statement that, when executed by the database management system, causes the database management system to retrieve the values from the plurality of tables represented in the graph as a result set; querying the relational database using the single query statement to obtain the result set; and populating the software object with one or more values of the result set.

20 Claims, 5 Drawing Sheets

OBJECT RELATIONAL MAPPING WITH A SINGLE DATABASE QUERY

BACKGROUND

This specification relates to object relational mapping of relational databases.

A relational database is a database storing tuples in one or more relations. In this specification, a database table is a relation having one or more tuples, with each tuple having one or more elements that each correspond to a respective attribute of the relation. The tuples belonging to a database table can be stored in any appropriate form, and a relation being referred to as a database table does not imply that its tuples are stored contiguously or in tabular form. In addition, each tuple can be stored as a "record" in a "row" of the table, and each attribute of an entity can be represented as a column in the table with a respective value representing that attribute in each tuple.

Also in this specification, the term "entity" will be used to refer to a tuple, or a portion of a tuple, in a relation. For example, a book entity can refer to all or part of a tuple representing a book in a book table. A book entity represented in a table can be updated, e.g., with an author name and a publication date, while other tuple attributes for the book entity can remain the same, e.g., a publication year.

Relational databases can store tuples representing different kinds of relationships. For tables storing data representing one or more entities, and each entity identified by a primary key, a first entity in a first table is said to have a relationship with a second entity in a second table if the first entity stores the primary key of the second entity. From the perspective of the first entity, the first entity is said to store a foreign key for the second entity, e.g., a primary key foreign to the first table. From the perspective of the second entity, the first entity is said to store the primary key for the second entity. The second entity may additionally store the primary key of the first entity.

A relationship between tables occurs when a first table stores a reference, e.g., a foreign key, of one or more entities whose data are stored at a second table. The first table is also said to "reference" the second table, by virtue of storing these foreign keys.

Relationships between tables can be represented as a graph, with each node in the graph representing a table, and each edge linking a pair of nodes and representing a relationship between tables represented by the linked nodes.

A software object is a data abstraction of one or more entities as defined by an object-oriented programming language, such as Java, Python, or C++. For example, a software object can abstractly represent an entity, e.g., a book object representing values attributed to a book entity. A software object can be any combination of functions, variables, and data structures representing data.

Object relational mapping refers to a class of programming techniques for converting tuples representing entities into corresponding fields or data structures of software objects, and vice versa from software objects to tuples. These software objects can then be manipulated according to functions defined in an object-oriented programming language. Object relational mapping can be performed by object relational mappers ("ORMs"), which can query a database storing the entity data and, from the queried data, maintain an object mapping and populate software objects with the queried data.

A query to a database can be defined according to a domain-specific language, e.g., SQL, defined for communicating with a database management system ("DBMS") for the database. A query can include multiple statements for retrieving data according to conditions specified in each statement, e.g., a "SELECT" statement in SQL.

For example, in SQL, one such statement can be:

SELECT*FROM T

In this example, T is a table of a database. The example SQL statement selects all columns and corresponding data (indicated by the wildcard "*") from table T. In general, statements target one or more columns of data at one or more tables.

TABLE 1 is an example of a table of records:

TABLE 1

| ID | ... | Book Name | FK |
|----|-----|-----------|-----|
| 1 | ... | $Name_1$ | 3465 |
| 2 | ... | $Name_2$ | 3465 |
| 3 | ... | $Name_3$ | 8938 |
| 4 | ... | $Name_4$ | 2365 |

In TABLE 1, four records are shown, representing four book entities. Of the records, each record has an "ID" representing an ID for each record, i.e., a primary key, an "item name" representing a string identifier of a book, and an "FK" attribute representing a foreign key for an author entity in a parent author table and representing an author of books. TABLE 1 omits other attributes that could be included for each record, for ease of explanation. For example, although TABLE 1 shows a single column containing values for primary keys of each record, a table of records can store multiple columns each storing a multi-part key for each record in the table, e.g., with each part of the key representing a different element associated with the record. Multiple books can reference a common author entity to represent that the books are written by the same author. For example, the books with ID values 1 and 2 both reference the same author entity with the foreign key 3465.

Under a conventional approach, in querying all the data as shown in TABLE 1, the result set can include data as follows, in TABLE 2:

TABLE 2

| Book | Author |
|------|--------|
| $Book_1$ | $Author_{3465}$ |
| $Book_2$ | $Author_{3465}$ |
| $Book_3$ | $Author_{8938}$ |
| $Book_4$ | $Author_{2365}$ |

In TABLE 2, $Book_k$ represents all of the attributes for the book entity represented at ID-row k in the book table. Similarly, $Author_k$ represents all of the attributes for the author entity represented at ID-row k in the author table. As can be seen, the $Author_{3465}$ is repeated, once for $Book_1$, because row 1 of the book table included the foreign key for $Author_{3465}$, and once again for $Book_2$.

This problem of duplication is exacerbated for larger tables, and databases with tables having multiple parent-child relationships. For example, a Author may have published books, essays, and periodicals, all represented as records in respective tables. A result set of a query for Author records in this example would be, in the worst case, of a size equal to the cardinality of each referencing table, i.e., the cardinality of a Book table, an Essay table, and a Periodical table multiplied together.

In practice, tables often store references to other tables stored in the database. For example, if table T stored data representing book entities, then table T might also store references to other tables, such as a table storing data representing author entities who authored books represented by the book entities of table T. To retrieve all data corresponding to table T referencing multiple child tables, would conventionally require at least two statements: a first statement to select the data stored in table T, and subsequent statements to select data stored in respective tables referenced by table T.

For more complicated relationships between tables, i.e., tables that reference and are referenced by multiple other tables, the time to execute the query increases. This is because, conventionally, ORMs execute query statements one at a time. For each statement, the ORM sends the statement to the DBMS of the relational database for processing. The DBMS processes the statements and generates a result set for that query. Then, the DBMS sends the result set back to the ORM. The ORM, in turn, can optionally process the received result set and send the next statement to the DBMS, and repeat the process until every statement is executed.

In addition to the multiple roundtrips of statements and result sets between a DBMS and a querying device, to retrieve a data set, ORMs can generate queries that cause a DBMS to return a result set that contains multiple copies of the same data. For example, if the same author authored multiple books represented by book entities in the table T, then when the DBMS executes a query generated by an ORM, the result set will contain multiple copies of the same author entity, for each book. For databases with complicated relationships between tables, the problem of duplicative data in a result set grows rapidly, and in a worst case can be equal to the product of the cardinality of each table stored in a given database.

SUMMARY

This specification describes technologies for a system including an object relational mapper ("ORM") to retrieve data from a relational database using a single automatically generated query statement. After retrieving the data, the system can, e.g., populate software objects as data abstractions of entities represented by the data retrieved by executing the single query statement at a relational database. The software objects can then be represented collectively in an object graph, or manipulated according to pre-defined functions of an object-oriented programming language. The system can retrieve requested data in a single query statement and avoid multiple queries, which can become costly to compute as the complexity and size of the database queried increases.

The system can automatically generate the query by exploiting a tree representation of relationships between tables stored in the relational database. In generating the single query statement, the system can leverage functionality defined in a domain-specific query language, e.g., SQL, and a database management system for the queried database configured to execute the query language. Specifically, the system can generate a query statement that uses analytic (or "windowing" functions), full outer joins (either natively implemented by the query language, or simulated), and inline views to recursively generate a single query statement, that when executed by a DBMS receiving the query statement, causes the DBMS to generate a result set of each queried record exactly once, i.e., with no duplicates.

A view is a query that can be referenced and queried as if it were a table in a database, and is stored in the database. An inline view is temporary and not stored in the database, and replaces the portion of a query that targets one or more tables of a database. Rather than generating a query statement that directly queries each table of the database, the system can generate the single query statement to query an inline view collectively representing each table to be queried. The inline view itself is generated in a recursive manner by generating multiple intermediate inline views, with the final result being the DBMS receiving a single query statement and providing a single result set for the query. This is in contrast to the conventional approach of generating multiple query statements, in which multiple database queries are required to be executed in order to retrieve all the data satisfying the query.

Particular embodiments of the subject matter described in this specification can be implemented so as to realize one or more of the following advantages. A system can query a relational database with an arbitrary amount of nested tables that reference one another according to a tree, using a single query statement. Not only does the system avoid the multiple roundtrips from DBMS to querying device caused by executing multiple query statements to retrieve data in the nested tables, but the single query statement can be generated in such a way so as to eliminate duplicative data in result sets obtained from executing the query. The single query statement can be generated automatically and by the same process regardless of the data to be retrieved, or the composition of the tree of tables to be queried, e.g., the number of tables or number of child-parent relationships between the tables, including the number of children for each parent table.

Relational databases storing tables that reference other tables according to a tree structure can be exploited by techniques described in this specification. Even when relationships between tables cannot be represented as a tree but only as a graph generally, the system can still improve the efficiency of querying the database by partitioning, in the database, tables forming relationships represented as a tree within the graph, and generating a single query statement to obtain a result set of data from those partitioned tables. Then, the query statement can be augmented with additional queries as necessary to retrieve remaining data in tables not partitioned and represented by the tree.

Even for very large tables and many nested references between the tables, the system implementing the techniques described in this specification can generate and later re-use the query statement to satisfy requests for data from the database, e.g., by an object relational mapper to generate an object tree or to populate a software object. The system can also generate a query statement that sorts data from some or all of the tables queried, which can improve the speed at which software objects representing sorted data structures are populated. The query statement can be generated ahead of time as a materialized view to further improve the time in which data is queried, particularly in applications in which the same tables are queried multiple times. The stored materialized view can be optionally modified and executed ahead of time so that the result set is ready for retrieval from a querying device, without performing the underlying query again at the time the device queries for the result set. Alternatively, the system can save the query statement for modification and/or execution at a later time, without preemptively storing the result set.

Because of the manner in which the system can generate the query statement, the system can flexibly generate queries for arbitrary databases that are more computationally efficient to generate and execute than hand-written queries or queries generated with multiple statements by conventional techniques. The system can also realize computational improvements in data retrieval time for queries to databases storing data from different tables but referenced by one or more common key columns, e.g., as objects representing data from clusters of tables.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
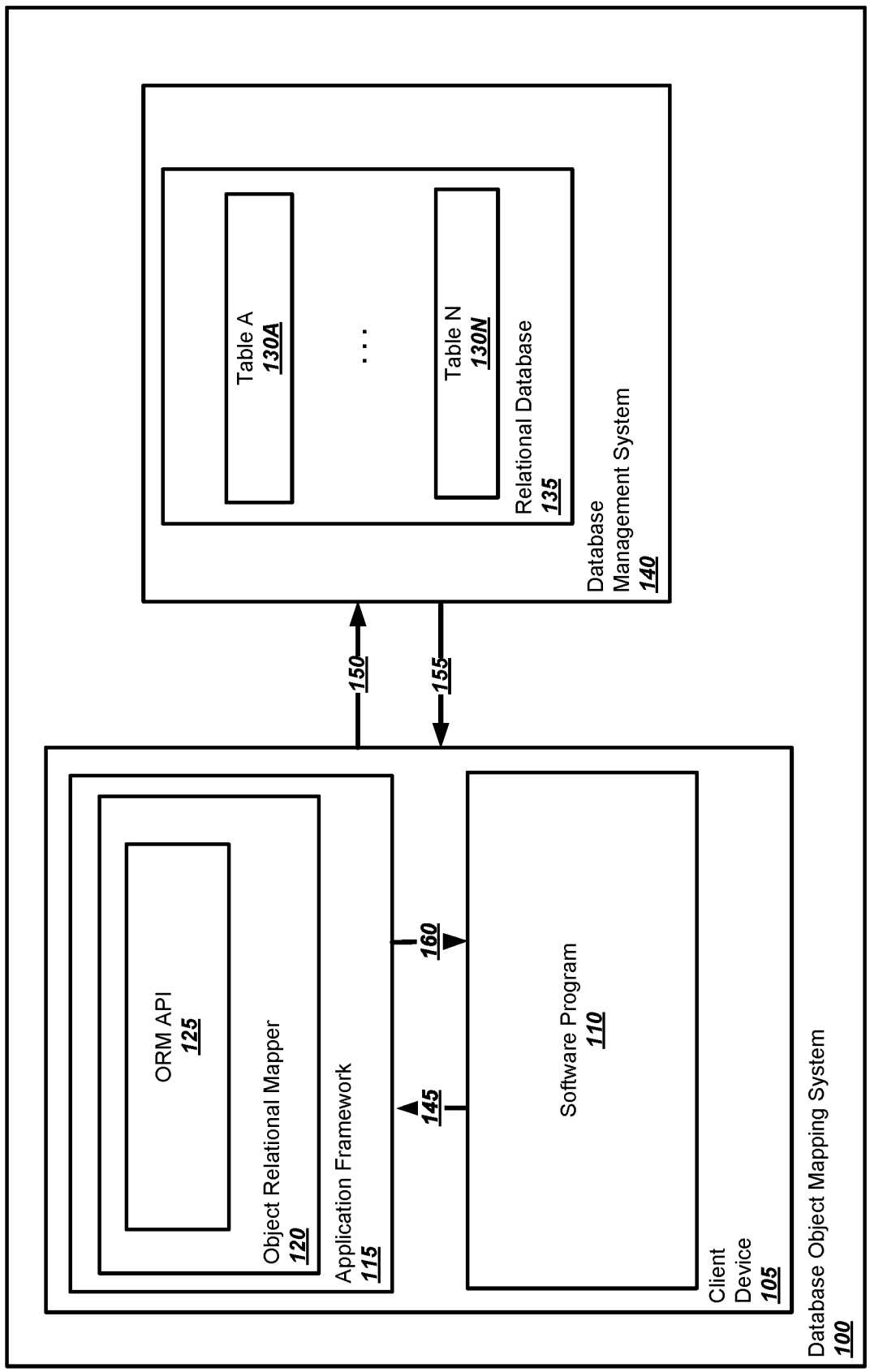
FIG. 1 is a diagram of a database object mapping system.

FIG. 1 is a diagram of a database object mapping system 100. The system 100 is an example of a system implemented as computer programs on one or more computers in one or more locations, in which the systems, components, and techniques described below can be implemented.

The system 100 can include a client device 105, e.g., an application server, a mobile device, or a terminal. The client device 105 additionally stores a software program 110 and has installed an application framework 115. The application framework 115 includes an object relational mapper ("ORM") 120.

The application framework 115 can provide a runtime environment to execute the software program 110. The software program 110 can be written according to any object-oriented programming language, e.g., Java, Python, or C++. The application framework 115 can be written in the same or different programming language as the software program 110.

The software program 110 can be written to include one or more instructions, which, when executed by the application framework 115, invokes the ORM 120 to perform operations related to populating a software object with data corresponding to one or more entities represented by data stored in a relational database 135. The one or more instructions can include functions defined by an ORM Application Program Interface ("API") 125. In general, the ORM API 125 can define a plurality of functions, that when executed by the ORM 120, causes the ORM 120 to populate a software object, e.g., as part of a request 145 from the software program 110.

It is understood that the instructions of the software program 110 can include a plurality of requests to populate a plurality of respective software objects, and that the techniques of the disclosed subject matter can be performed repeatedly for each request to populate a respective software object.

Other functions defined by the ORM API 125 can include functions that when executed by the application framework 115, cause the application framework 115 to invoke the ORM 120 to generate a single query statement according to one or more parameter values. These parameter values can be specified as arguments to an API-defined function executed by the application framework 115, and can represent parameters that specify characteristics of a result set of data the query statement should return when executed. For example, the parameters can include conditions for the data queried, which tables to query the data from, or whether all or some of the data returned in the result set should be sorted.

A database management system ("DBMS") 140 manages the relational database 135 and can be configured to receive and execute queries according to any query language with defined functions for querying databases, including sending 150 a single query statement generated by the ORM 120 to the DBMS 140.

The ORM 120 can generate a single query statement to retrieve a result set from a relational database with an arbitrary number of nested references between tables stored in the database. The ORM 120 can retrieve requested data, e.g., to populate a software object, using computationally fewer resources, because the query executed by the DBMS 140 contains only one statement to execute. Rather than generating multiple statements to select data from different tables stored in the relational database 135, the ORM 120 can exploit a tree representation of relationships between the tables 130A-N and generate an inline view. The single select statement queries the inline view, which can represent an arbitrary number of tables within the relational database 135. The inline view is not stored in a relational database as a conventional table or view would, but rather functions as a layer of abstraction for simplifying queries to multiple tables.

The DBMS 140 generates a result set of records from queried tables stored in the relational database 135. Although illustrated as a separate system in FIG. 1, the DBMS 140 can also be installed on the client device 105 and can be part of the application framework 115.

As described below, the ORM 120 can query the relational database 135 using a single statement in any query language in which the DBMS 140 is configured to receive queries in, e.g., SQL. The relational database 135 organizes data by relation, tuple, and elements within the tuples. The relational database 135 stores tuples in a plurality of tables 130A-N. Each table stores data for entities of a particular type. For example, the relational database 135 can have a Book table for storing Book entities, and an Author table for storing Author entities.

The ORM 120 can maintain a mapping between entities represented in the relational database 135 with corresponding software objects in the program 110. The entity mapping represents which software objects in the program 110 are mapped to which corresponding entities in the relational database 135.

To update the entity mapping, the application framework 115 can receive an explicit request from the program 110, e.g., by an instruction in the program 110, that when executed by the application framework 115, causes the application framework 115 to update the entity mapping. Alternatively, the application framework 115 can be configured to update the entity mapping 135 following execution of a request to populate a software object in the software program 110.

For example, the software program 110 contains one or more instructions, that when executed by the application framework 115, cause the ORM 120 to populate a book object with attributes corresponding to a book entity in a book table from the plurality of tables 130A-N. Additionally, the book entity is in a relationship with one or more author entities, representing the authors of the book, from an author table in the plurality of tables 130A-N.

To obtain the result set of data needed to populate the software object, the application framework 115 can query the relational database 135 using the single query statement generated by the ORM 120. For example, the ORM 120 sends 150 a query to the relational database 135 for the title of a book entity, in response to a request to populate a book object in the program 110 with the title of the respective book entity. The query can cause the DBMS 140 to return 155, as part of the result, attributes of the book entity, e.g., the title of the book, as well as the list of foreign keys for entities related to the book entity, e.g., authors of the book. Entities related to the book entity can be stored on other tables of the plurality of tables 130A-N. Related entities can themselves reference other entities stored in other tables of the plurality of tables 130A-N, e.g., each author entity can be related to an editor entity whose data is stored on an Editor table.

In response to the query, the DBMS 140 can process the query through the relational database 135 and can return 155 a result set to the ORM 120.

The application framework 115 can populate a software object in response to the request by the software program 110 with data obtained in the result set. The software object can be provided 160 to the software program 110. The software program 110 can then read data or modify the software object according to one or more functions specified in the software program 110. The ORM 120 can also update the maintained entity mapping to map the populated software object to the entity whose data was queried as part of the result set.

Figure 2A:
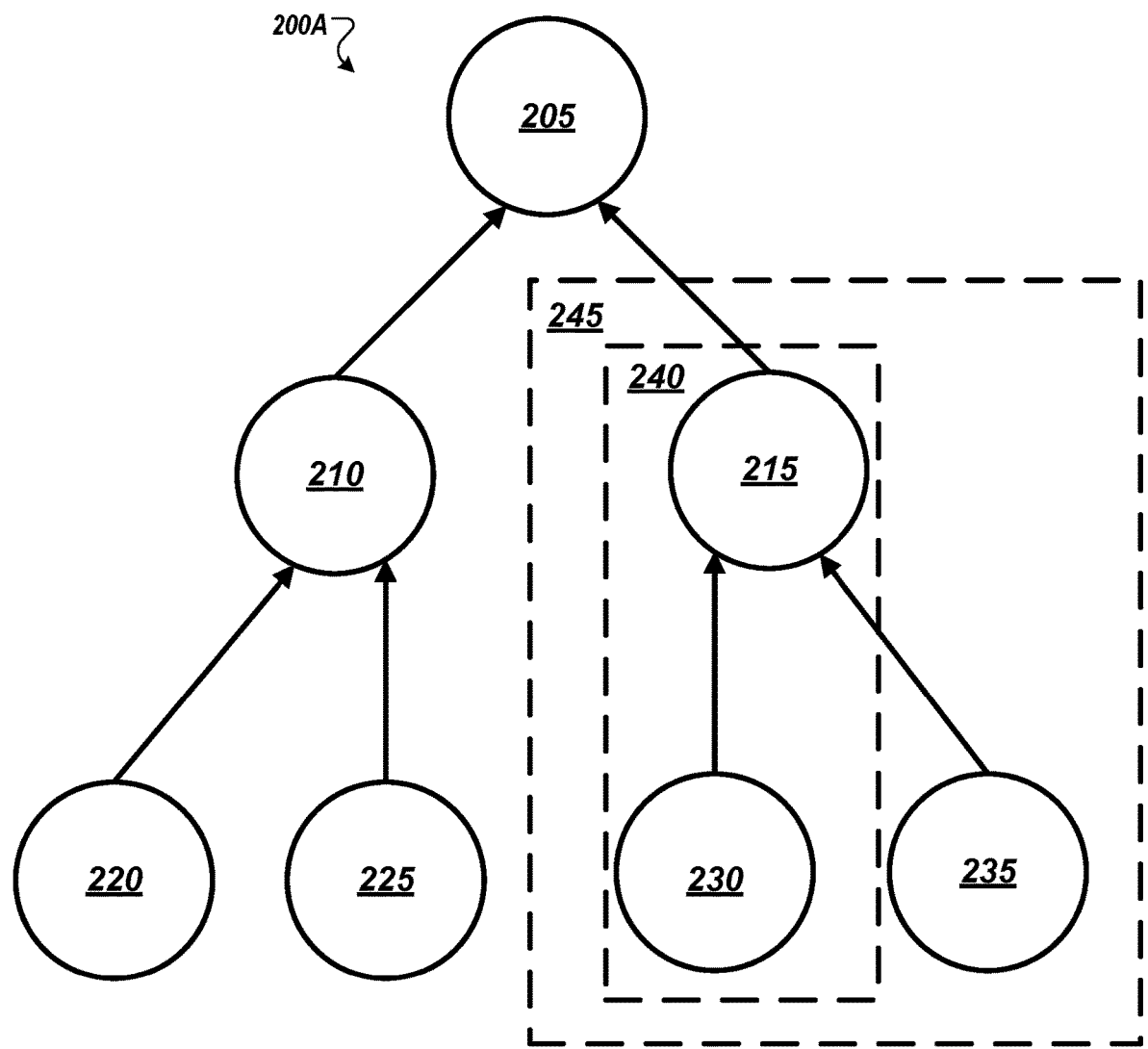
FIG. 2A is a tree representation of relationships between tables in a relational database.
Figure 2B:
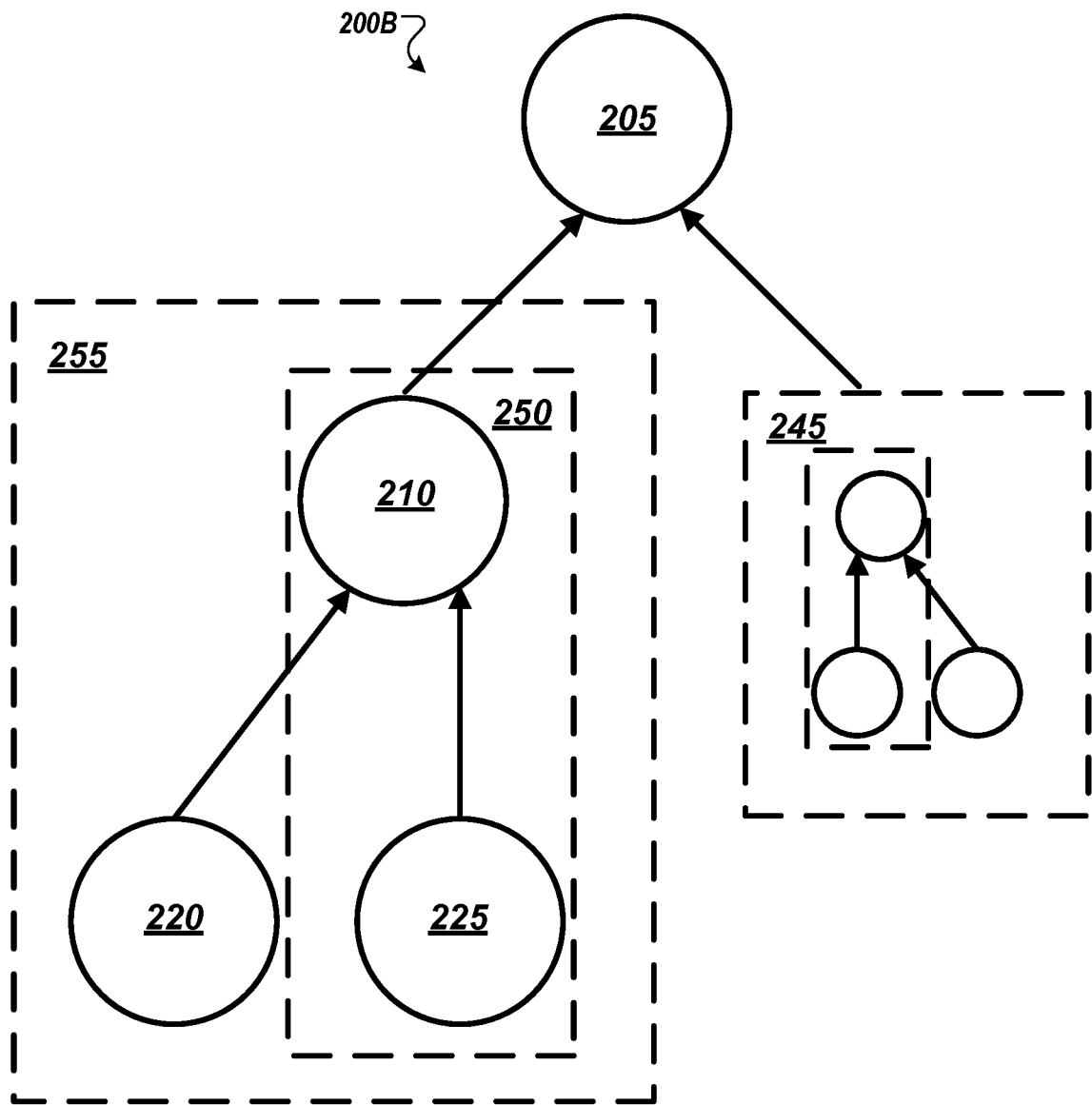
FIG. 2B is a tree representation of relationships between tables in a relational database with an intermediate inline view.
Figure 2C:
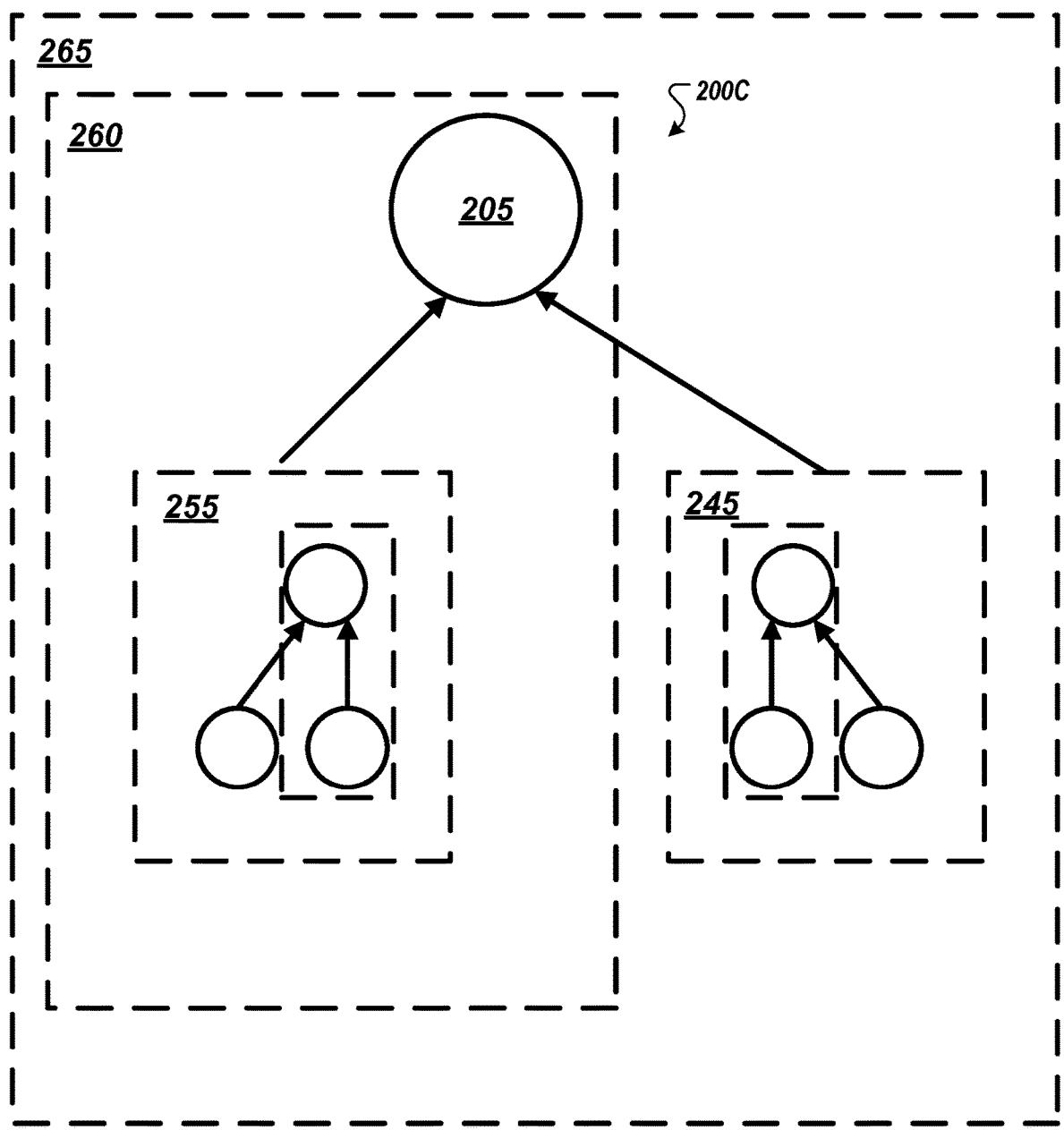
FIG. 2C is a tree representation of relationships between tables in a relational database with two intermediate inline views.

FIGS. 2A-C show how an ORM, e.g., the ORM 120, can generate a single query statement for querying a relational database.

FIG. 2A is a tree 200A of relationships between tables in a relational database. A tree is a graph in which:

(i) Every node in the graph is connected to at least one other node;

(ii) Each edge in the graph is directed; and (iii) There are no loops in the graph, i.e., the graph is acyclic.

The tree 200A shown in FIG. 2A includes seven nodes 205-235. Node 205 is the root of the tree, and is a parent node to node 210 and node 215. Node 210, in turn, is a parent node to node 220 and node 225. Similarly, node 215 is a parent node to node 230 and node 235. Because nodes 220, 225, 230, and 235 are not parent nodes, i.e., they have no "child" nodes, they are referred to as child or leaf nodes.

Each node represents a respective table of a relational database, e.g., the relational database 135. Edges between the nodes represents that a table of a child node references a table represented by a parent node linked to the parent node by the edge. Specifically, this means that the child nodes reference a parent node. Not every entity in a parent table has to reference an entity in a child table, but the tables are said to be related because at least one entity in the parent table references an entity in the child table.

In some cases, different entities in the table represented by the leaf/child table reference the same entity in the table represented by the parent node 215. To prevent the result set from returning data for the same-referenced entities more than once as a result of these duplicate references, the ORM 120 can augment the query statement by invoking an analytic function (also called a "windowing" function). An analytic function is a function that performs an operation across multiple rows of a table, i.e., only operating on rows within a "window," that can be specified as one or more arguments to the analytic function. In SQL, an analytic function can be specified according to the following syntax:

[FUNCTION] OVER ([PARTITION BY X][ORDER BY Y])

A FUNCTION is defined to be performed on a table OVER a PARTITION and/or an ORDER. OVER is a SQL keyword for specifying an argument for an analytic function, but the specific syntax of this and other keywords can vary depending on the query language. PARTITION BY X is a SQL keyword for dividing the selected table or tables into one or more partitions, where each partition includes records that have the same values in one or more columns specified by the expression X. The analytic function can also include ORDER BY Y, which orders the rows in each partition according to values in one or more columns specified by the expression Y.

The ORM 120 generates the single query statement to include an analytic function that assigns a number to each row in the table represented by the child node so that each record with a reference to the same foreign key is assigned a unique number. The numbering provided by the analytic function can be described as an "artificial column," because while the data stored in the table is not modified, the query statement associates each table with the artificial column generated by executing the analytic function.

Consider again TABLE 1, above, and reproduced below, for convenience:

TABLE 1

| ID | ... | Book Name | FK |
|---|---|---|---|
| 1 | ... | $Name_1$ | 3465 |
| 2 | ... | $Name_2$ | 3465 |
| 3 | ... | $Name_3$ | 8938 |
| 4 | ... | $Name_4$ | 2365 |

The result of the ORM 120 executing such an analytic function on the data shown in TABLE 1 is shown in TABLE 3:

TABLE 3

| ID | ... | Book Name | FK | AC |
|---|---|---|---|---|
| 1 | ... | $Name_1$ | 3465 | 1 |
| 2 | ... | $Name_2$ | 3465 | 2 |
| 3 | ... | $Name_3$ | 8938 | 1 |
| 4 | ... | $Name_4$ | 2365 | 1 |

In TABLE 3, a new artificial column is added, called AC. Beginning with the first record with an ID of 10, the query statement generated by the ORM 120 causes the DBMS 140 to execute an analytic function that assigns the first record with the value of 1. The second record with an ID of 2 is assigned a value of 2, because the first record and the second record share the same FK of 3465. The third record with an ID of 3 is assigned a value of 1, because the third record has an FK that does not match any of the foreign keys of the previous records. Lastly, the fourth record with an ID of 4 is assigned a value of 1, because the fourth record also has an FK that does not match any of the foreign keys of the previous record.

As a first step, the ORM 120 can identify a leaf node of the tree 200A of a maximum tree depth in the tree. The tree-depth of a leaf node is the number of levels between the root of the tree (always defined to be at level 0), and the leaf node. In this example, the four leaf nodes of the tree 200A share a maximum tree-depth of two, because the difference between the level of the leaf nodes (two) and the level of the root node (zero) is two. For a tree containing multiple leaf nodes, the ORM 120 identifies one or more leaf nodes that have the largest tree depth out of all of the leaf nodes, and selects one of those nodes.

Which leaf node the ORM 120 selects does not matter, so long as the leaf node selected has the largest tree-depth out of all of the leaf nodes of the tree. For example, in situations in which there are more than one leaf nodes in a tree having the largest tree depth, the ORM 120 can select a leaf node randomly. For the purposes of explanation, the ORM 120 can select the node 230 as the starting leaf node.

The ORM 120 generates the query statement while traversing a tree of related tables, e.g., the tree 200A. At each iteration, the ORM 120 merges a parent and a leaf node together, as described below with reference to FIGS. 2A-C. Each node represents either a table, or an inline view. As part of iteratively generating the query statement, the ORM 120 updates the query statement depending on the combination of table and in-line views represented by the nodes to be merged at the iteration. The combinations include (i) both nodes representing tables; (ii) a parent node representing an inline view and a child node representing a table; (iii) a parent node representing a table and a child node representing an inline view; and (iv) both nodes representing inline views.

TABLE 4 illustrates a portion of an example query statement generated by the ORM 120 to generate a inline view from a table represented by a leaf node and a table represented by its parent node, e.g., leaf nodes 230 and 235 of FIG. 2A, and their parent node 215 to generate the intermediate inline view 240.

of the JOIN contains all columns from both tables. Each row of the result set has one row from each table that fulfills a JOIN condition. Different JOIN conditions include: INNER JOIN, LEFT (OUTER) JOIN, RIGHT (OUTER) JOIN, and FULL OUTER JOIN. In particular, A FULL OUTER JOIN is a SQL keyword that when executed, causes the DBMS receiving the query to generate a result set in which each row from the joined tables appears at least once. If the first joined table has rows that are not matched in the second joined table, then rows in the result set corresponding to the second joined table will have a value of null in each column from the first joined table and vice versa.

The FULL OUTER JOIN in line 8 is invoked with four arguments, a set of columns, a first table, a second table, and a condition. The set of columns begins with all of the columns in the parent table P and the child/leaf table L, represented as P.* and L.*, respectively, in lines 5-6. The ORM 120 can automatically handle name collisions between columns of P and L having the same name, and appropriately modify the name of one or both columns to avoid the collision. In this example, every row is being queried by the ORM 120. In some implementations, the ORM 120 can generate more specific queries by modifying lines 5-6. Rather than specifying all of the data, the ORM 120 can specify only a portion of each table, depending on the situation that requires the ORM 120 to query the database, e.g., user-provided parameter values to an ORM API-defined function for populating a software object or querying the relational database.

The first table is the parent table of the node 215 shown as the table P in line 7. The second table is an augmented version of the table L, shown in line 12, and obtained by the SELECT statement shown in lines 9-11. The condition for the FULL OUTER JOIN is shown in line 13 and is described below.

If the ORM 120 is configured to generate a query statement in a query language that does not natively support a full outer join as provided by the FULL OUTER JOIN keyword in SQL, the functionality of a full outer join can be simulated. For example, instead of a full outer join, the ORM 120 can specify a UNION ALL of: (i) a LEFT JOIN of the first and second table; and a (ii) RIGHT JOIN of the first and

TABLE 4

```
1   SELECT
2   GREATEST(1, L.AC) AS AC,
3   GREATEST(P.ID, L.FK) AS ID,
4   MAX(P.FK) OVER(PARTITION BY GREATEST(P.ID, L.FK)) AS FK,
5   P.*,
6   L.*
7   FROM P
8   FULL OUTER JOIN (
9       SELECT
10      ROW_NUMBER( ) OVER (PARTITION BY FK ORDER BY ID) AS AC
11      L.*
12  ) AS L
13  ON P.ID = L.FK AND 1 = L.AC
```

For ease of understanding, the description will begin from the innermost part of the statement. Line 8 includes the FULL OUTER JOIN keyword that when executed by the DBMS receiving the query, causes the DBMS to return all of the records between the table represented by the parent node 215 (represented as "P" in line 7) and the table represented by the leaf node 245 (represented as "L" in line 11).

In general a JOIN is a SQL keyword that when executed, combines rows from two tables to be joined. The result set second table, filtering out those rows that have non-null values for the first table. A LEFT JOIN returns all records from the first table and all records in the second table that match a respective record in the first table. Similarly, a RIGHT JOIN returns all records from the second table and all records in the first table that match a respective record in the second table. A UNION ALL of a RIGHT JOIN and a LEFT JOIN will return all records in both the first and second table, and but does not remove duplicates which occur from matching records that are included in the LEFT JOIN and the RIGHT JOIN. In some implementations, the FULL OUTER JOIN can be simulated by a UNION of the LEFT JOIN and RIGHT JOIN, when the tables joined do not have duplicate records. In SQL, a UNION will remove duplicate records between the selected tables.

The table L is augmented in lines 9-11 by an analytic function shown in TABLE 4 and reproduced, below:

ROW_NUMBER( ) OVER (PARTITION BY FK ORDER BY ID) AS AC

ROW_NUMBER( ) is a SQL function that assigns a number to each row within a partition. In this case, the partition is defined by the foreign key (FK) column of the rows, so that the ROW_NUMBER( ) will assign a number to each record in a partition from 1 to the number of records in the partition, and then reset the number for the next partition. Within each partition, the order is defined by the ID of each record, in this example, but can be defined by any order so-long as each record in the partition is assigned a unique number. Finally, the assigned numbers are given the alias of AC, i.e., an artificial column. TABLE 3, described above, shows an example of a row numbering created by this analytic function.

The SELECT keyword in line 9 returns all of the columns in the table L (indicated by "L.*" in line 11) and the artificial column AC. Together, the table L and the column AC form the second table in the FULL OUTER JOIN in line 8.

As described earlier, the fourth argument for the FULL OUTER JOIN in line 8 is a condition for joining the first and second table, shown in line 13, and reproduced below:

ON P.ID=L.FK AND 1=L.AC

P.ID is the primary key for the parent record, L.FK is the foreign key for the parent record stored in the leaf record, and L.AC is the artificial column value for the leaf record. The purpose of the condition is to include each parent row exactly once while filling the columns representing the parent table with null values for all but the first child row. The purpose of lines 2 and 3 is to ensure that neither the values for AC nor the ID are null when the condition for the FULL OUTER JOIN in line 13 is evaluated.

The GREATEST functions in lines 2 and 3 are configured to always return non-null values when at least one argument is non-null. In line 2, if L.AC is null, then GREATEST will return 1. L.AC may be null if there is no child record, P.ID is null for all but the first row returned for a given parent. In line 3, either P.ID or L.FK can be null, but not both. An alias for the foreign key column FK is also assigned in line 4, with another analytic function, reproduced below:

MAX(P.FK) OVER (PARTITION BY GREATEST (P.ID,L.FK)) as FK,

The analytic function operates on partitions of rows that reference the same parent, either by its respective primary ID or its respective foreign key. Note that the leaf table has a foreign key column with foreign keys referencing the parent table. The foreign key column FK is a new column for the result set generated by the analytic function and referencing the parent ID for each record.

Returning to FIG. 2A, because the node 215 represents a table that is a child to a table represented by 205. The analytic function in line 4 is defined to partition by the ID value as defined in line 3. Specifically, the ID value will always be non-null, because the ID value will either be the ID of the parent record, or the foreign key of a child record to the parent record. MAX(P.FK) ensures that if the parent table has some records with a parent foreign key and some records without a foreign key, that that only a non-null foreign key is aliased to FK in the query statement.

The two requirements for including a record from either the first table or the second table as part of the result for the full outer join are: (i) P.ID=L.FK and (ii) 1=L.AC. The first requirement means that the records returned by the full outer join must include a foreign key of a parent entity in the table P. The second requirement targets the first record in each partition, which stores the data for the referenced parent record.

Executing the query statement as shown in TABLE 4 generates a inline view from a parent and a child table, and selects the rows within the inline view. As described above, because the ORM 120 starts generating the query statement from a max tree-depth leaf node, the query statement shown in TABLE 4 can result in the intermediate inline view 240 if the parent table P is the table represented by the node 215 and the child/leaf table L is the table represented by the node 230. The same statement can be used to generate an intermediate inline view for other pairs of parent/child tables in the tree shown in FIG. 2A, with only changes to the variables P and L required, as appropriate.

By numbering each record according to the expression in TABLE 4, the ORM 120 can select each parent entity exactly once, by skipping each record in which the artificial column is not 1. In this way, the result set generated by the DBMS 140 executing the query statement will not include duplicates of data representing the parent entity, for example duplicates of the parent entity represented by the FK 3465 in TABLE 2.

TABLE 5 shows the example result set of TABLE 2, but using a query generated by the ORM 120 as shown in TABLE 5:

TABLE 5

| Book | Publisher | FK | AC |
| --- | --- | --- | --- |
| $Book_1$ | $Publisher_1$ | 101 | 1 |
| $Book_2$ | null | 101 | 2 |
| $Book_3$ | $Publisher_2$ | 102 | 1 |
| $Book_4$ | $Publisher_3$ | 103 | 1 |
| null | $Publisher_4$ | 104 | 1 |

Unlike in TABLE 2, the copy of $Publisher_{3465}$ for $Book_2$ is replaced with a null. The entry $Publisher_n$ refers to all of the attributes of the Author entity having the foreign key n, which is generally represented as multiple columns. The ORM 120 can be configured to receive a result set in a format such as the format shown in TABLE 5, and re-use from a preceding non-null value in the column to populate a software object, e.g., a software object for $Book_2$. The software object for $Book_2$ can include the values or a reference to the values of $Publisher_{101}$ in memory on the client device 105 or other device executing the software program 110.

TABLE 6 shows how the ORM 120 updates the query statement to generate the intermediate inline view 245.

TABLE 6

```
1  SELECT
2    GREATEST(P.AC, L.AC) AS AC,
3    GREATEST(P.ID, L.FK) AS ID,
4    MAX(P.FK) OVER(PARTITION BY GREATEST(P.ID, L.FK) AS FK,
5    P.*,
6    L.*
7  FROM P
8  FULL OUTER JOIN {
9    SELECT
10     ROW_NUMBER( ) OVER (PARTITION BY FK ORDER BY ID) AS AC
11     L.*
12 } AS L
13 ON P.ID = L.FK AND P.AC = L.AC
```

The ORM 120 updates the query statement to include lines 1-13 of TABLE 6, upon determining that P represents an inline view, while L is a table. The variable P represents the intermediate inline view 240, which itself is represented by the expression in TABLE 4. FROM P as shown in line 7 of TABLE 6 targets the records obtained by executing the SELECT statement of TABLE 4. The variable L represents the table represented by the node 235. The expression in TABLE 6 is largely similar to the expression in TABLE 4, with some differences.

First, the inline view P can include multiple records with the same parent, representing the situation in which the original child table represented by the node 230 has multiple records referencing the same parent entity in the original parent table represented by the node 215.

As part of joining intermediate inline view 245 with the intermediate inline 240, the ORM 120 resolves naming conflicts caused by columns having the same names. For example, each intermediate inline view will have an AC column, therefore when the tables are joined the ORM 120 resolves naming conflicts according to some naming scheme. Below, in TABLE 7, a subscript notation is adopted to identify the column, but it is understood that any conventional naming scheme can be adopted to resolve naming conflicts.

An example representation of the intermediate inline view 245 is shown in TABLE 7:

TABLE 7

| # | 1 Publisher | 2 ID | 3 Book | 4 Author | 5 FK | 6 AC | 7 $FK_{Pub\_book}$ | 8 $AC_{Pub\_book}$ | 9 $FK_{Author}$ | 10 $AC_{Author}$ |
|---|---|---|---|---|---|---|---|---|---|---|
| 1 | $Pub_1$ | 1 | Null | Null | 101 | 1 | 1 | 1 | Null | 1 |
| 2 | $Pub_2$ | 2 | $Book_2$ | $Author_1$ | 102 | 1 | 2 | 1 | 2 | 1 |
| 3 | Null | 2 | $Book_3$ | Null | 102 | 2 | 2 | 2 | Null | Null |
| 4 | Null | 2 | $Book_4$ | Null | 102 | 3 | 2 | 3 | Null | Null |
| 5 | $Pub_3$ | 3 | $Book_5$ | $Author_2$ | 103 | 1 | 3 | 1 | 3 | 1 |
| 6 | Null | 3 | $Book_6$ | $Author_3$ | 103 | 2 | 3 | 2 | 3 | 2 |
| 7 | Null | 3 | Null | $Author_4$ | 103 | 3 | Null | Null | 3 | 3 |

As a consequence of the first difference, the join condition in line 13 is different, shown below:

ON P.ID=L.FK AND P.AC=L.AC

A record is joined by the FULL OUTER JOIN in lines 8-11 whenever the ID of the parent record in the inline view P matches the foreign key of the value for the child record in the child table L and the value of the AC for the parent record matches the value for the AC for the child record. The first condition matches children with respective parents, while the second condition orders each respective child of the parent by the same row numbering in the artificial column of a record in the parent table.

For example, consider the node 230 to represent a table of book entities, the node 215 to represent a table of publisher entities, and the node 235 to represent a table of author entities. The intermediate inline view 240 joins the book table and the publisher table, by the expression shown in TABLE 4. Next, the intermediate inline view 245 joins the intermediate inline view 240 with the author table represented by the node 235, by the expression shown in TABLE 6.

Regardless of the specific relationships between each record in the tables, the result set after executing the statement as shown in TABLE 6 includes the data for each queried record, without duplicate. Each record for each table is aligned by the respective value of the AC in the record, and null values fill the shorter columns. Specifically, columns 1-2 result from either executing lines 5-6 of TABLE 6. Columns 9 and 10 come from the child/leaf table L, which in this example is an author table. The subscript pub_book in columns 7 and 8 come from the parent P, which contains data from both the parent table (i.e., publishers) as well as a child (i.e., books). P contains null values for $Author_4$ because in this example it is the third author for $Pub_3$, which only has two books ($Book_5$ and $Book_6$). $Book_6$ shares the same row with $Author_3$ because it has an $AC_{pub\_book}$ of 2 (column 8) matching the $AC_{author}$ of 2 (column 10).

Data required to populate the software object is available in the result set that the DBMS 140 generates in response to the query statement in TABLE 6, generated by the ORM 120. Further, if the data is ordered as shown in TABLE 7, i.e., first by the Publisher ID and then by the AC columns, then data from the result set can be accessed in a contiguous manner to populate a software object. For example, to populate a software object with all of the data for, the ORM 120 can load all of the data from the second row of TABLE 7 which includes the attributes of Publisher$_2$, as well as the next two rows, containing attributes of records that are children to Publisher$_2$, i.e., Book$_2$, Book$_3$, Book$_4$, and Author$_1$. The additional rows storing data corresponding to Publisher$_2$ are sequentially numbered in the AC$_{publisher}$ column. When the next Publisher is reached, i.e., Publisher$_3$, the AC$_{publisher}$ column resets to 1.

Note in this example that the Book$_2$, Book$_3$, Book$_4$ are children of Publisher$_2$. A corresponding AC$_{pub\_book}$ column tracks the Publisher and Book entities in the same way as how the AC$_{author}$ column tracks the Author entities in the current view shown in TABLE 7.

Also, each intermediate inline view includes the AC and FK columns of the inline views generated below it in the tree, as the tree is iterated through from leaf to root.

FIG. 2B is a tree 200B of relationships between tables in a relational database with an intermediate inline view. Here, the intermediate inline view 245 is represented by a single node that is a child to the root node 205. The ORM 120 can continue to generate intermediate inline views from the remaining maximum tree-depth leaf nodes of the tree 200. Specifically, the ORM 120 can update the single query statement to generate an intermediate inline view 250 from the table represented by the leaf node 225 and the table represented by the parent node 210. The ORM 120 generates a query statement that represents the intermediate inline view 245 as the expression in TABLE 4. The parent P is the table represented by table 210, and the leaf L is the table represented by the node 225. The generated query statement represents the intermediate inline view 250.

After generating the intermediate inline view 250, the ORM 120 updates the query statement that represents the intermediate inline view 250 to generate an intermediate inline view 255 that includes the table represented by the leaf node 220 and the intermediate inline view 250. Specifically, the ORM 120 augments the query statement representing the intermediate inline view 250 with the expression shown in TABLE 6. The inline view P is the intermediate inline view 250, and the child table L is the table represented by the node 220.

The ORM 120 repeats the process described above with reference to FIG. 2A and FIG. 2B, for each level of the tree. In FIG. 2A, the tree has three levels. In FIG. 2B, the tree has two levels, the root level and the level of the generated intermediate inline views 255 and 245. The ORM 120 can continue to update a single query statement with an increasingly larger inline view, until the whole tree is represented as an inline view.

FIG. 2C is a tree 200C of relationships between tables in a relational database with two intermediate inline views. The root node 205 is parent to the intermediate inline view 255 and the intermediate inline view 245. The ORM 120 again selects a leaf node of the tree 200C with the largest tree-depth. Both the nodes representing the intermediate inline view 255 and the intermediate inline view 245 have the largest tree depth in the tree 200C. Following the example as shown in FIG. 2C, the ORM 120 selects the intermediate inline view 255.

The techniques described in this specification can also be used even if the tables in the relational database queried are not structured according to a tree. In some implementations, the ORM 120 can determine whether the graph representing the relationships between the tables 130A-N is a tree or not. For example, the ORM 120 can determine whether the graph has cycles, e.g., using breadth-first search or depth-first search. If the ORM 120 determines that the graph has at least one cycle, then the graph is not a tree.

Alternatively or in addition, the ORM 120 can identify a directed tree of nodes representing tables in a graph of nodes representing relationships between the plurality of tables 130A-N. For example, the ORM 120 can apply the same approaches to identifying whether a graph is a tree, and copy each traversed node and edge to a separate graph. When the ORM 120 identifies a cycle in the original graph, the ORM 120 can implement the techniques described in this specification to the separately maintained graph, which is a tree.

Then, the ORM 120 can generate additional query statements to query the tables that were not represented in the identified tree. Overall, the ORM 120 can improve the speed at which the relational database is queried, because all of the tables represented by the nodes in the identified tree can be queried with the same single query statement. In some implementations, the ORM 120 can identify additional directed trees of nodes in the graph of nodes representing relationships between the tables not represented in the identified tree, using the same technique as described above. In doing so, the ORM 120 can generate respective single query statements for each additional tree, further reducing the number of query statements needed to query a database of tables that do not have relationships represented by a single directed tree.

Figure 3:
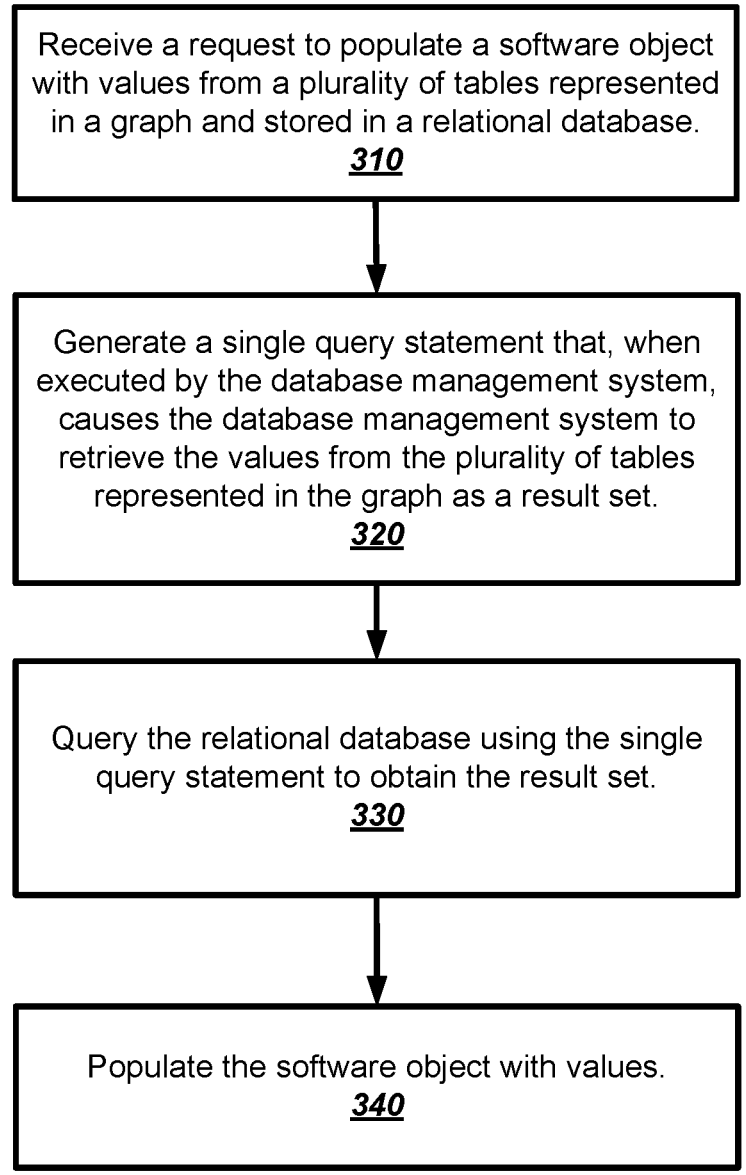
FIG. 3 is a flow chart of an example process for populating a program object in a program.

FIG. 3 is a flow chart of an example process for populating a software object of a software program with data stored in a relational database. For convenience, the process will be described as being performed by a system of one or more computers located in one or more locations. For example, a database object mapping system, e.g., the database object mapping system 100 of FIG. 1, appropriately programmed in accordance with this specification, can perform the process. Additional detail for implementing a system that can perform the process can be found in the descriptions of FIG. 1 and FIGS. 2A-C, above.

The system receives 310 a request to populate a software object with values from a plurality of tables represented in a graph. As described above with reference to FIG. 1 and FIGS. 2A-C, the relationships between tables in the relational database can be represented as a graph with nodes representing tables, and edges linking pairs of nodes representing tables that reference one another.

The system generates 320 a single query statement that, when executed by a database management system of the relational database, causes the database management system to retrieve the values from the plurality of tables represented in the graph, as a result set. The values of the result set depend on the request to populate the software object. The system can generate a single query statement from returning all values in stored in tables of the relational database, represented as a single inline view. Then, as shown in step 330, the system can query the inline view and obtain the values of the request for populating the software object. This approach has the added advantage of generating the inline view representing all of the tables in the database that can be queried to return values in subsequent requests. Otherwise, the system can generate the single query statement that when executed by the DBMS, causes the DBMS to generate the result set containing only the requested values for populating the software object.

The system queries 330 the relational database using the single query statement to obtain the result set. Specifically, the system can send the single query statement to the DBMS maintaining the relational database, and the DBMS can generate the result with the requested values for populating the software object. Also, because the single query statement was generated according to techniques described in this specification, the result set does not contain duplicative data.

The system populates 340 the software object. The system takes values from the obtained result set to populate the software object, as appropriate. As described above, the system can obtain a result set containing more data than what is necessary to populate the software object. The system can be configured to do this if it is likely that the system will use the extra data for other reasons, such as populating additional software objects. Because the computational complexity of generating the single query statement negligibly increases for additional data queried, the system can be configured to query the database for all or large portions of the database stored in the tables, to prevent having to execute another query statement.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, an app, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a backend component, e.g., as a data server, or that includes a middleware component, e.g., an application server, or that includes a frontend component, e.g., a client computer having a graphical user interface, a web browser, or an app through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached embodiments and the embodiments described above, the following embodiments are also innovative:

Embodiment 1 is a method comprising:

receiving a request to populate a software object with values from a plurality of tables represented in a graph, the plurality of tables stored in a relational database maintained by a database management system, each table comprising one or more respective tuples of values;

generating a single query statement that, when executed by the database management system, causes the database management system to retrieve the values from the plurality of tables as a result set having a plurality of rows of data from each of the plurality of tables, wherein between a parent table and a child table in the graph, the result set includes a row having parent values from the parent table and child values from one row of the child table;

querying the relational database using the single query statement to obtain the result set; and populating the software object with one or more values of the result set.

Embodiment 2 is the method of embodiment 1, wherein the result set includes, for subsequent rows of child values having the same parent values in the relational database, null values for each of the parent values.

Embodiment 3 is the method of any one of embodiments 1-2, wherein the single query statement causes the database management system to retrieve each row from each relevant table exactly once.

Embodiment 4 is the method of any one of embodiments 1-3, wherein generating the single query statement comprises performing a plurality of iterations to build the query, wherein on each iteration a query statement generated for a child table is referenced by a query statement generated for a parent table.

Embodiment 5 is the method of embodiment 4, wherein each iteration generates a new inline view representing merged values from the parent table and the child table.

Embodiment 6 is the method of embodiment 4, wherein performing the plurality of iterations comprises iterating from child nodes in the graph to a root node of the graph.

Embodiment 7 is the method of any one of embodiments 1-6, wherein the single query statement causes the database management system to generate artificial columns having values that distinguish child rows that reference a same parent row.

Embodiment 8 is the method of any one of embodiments 1-7, wherein one or more tables of the plurality of tables store references to other tables of the plurality of tables, wherein the graph comprises nodes and edges, wherein each node represents a table of the plurality of tables and each edge linking a respective pair of nodes represents a reference of a first table represented by a first node of the pair of nodes stored by a second table represented by a second node of the pair of nodes, and wherein generating the single query statement comprises generating a inline view from the graph, wherein the inline view represents each table of the plurality of tables represented in the graph, and wherein querying the relational database using the single query statement causes the database management system to generate the result set from the inline view.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   receiving a request to populate a software object with values from a plurality of tables represented in a graph, the plurality of tables stored in a relational database maintained by a database management system, each table comprising one or more respective tuples of values;
   using analytic functions, full outer joins, and inline views to recursively generate a single query statement such that, when executed by the database management system, the single query statement causes the database management system to retrieve the values from the plurality of tables as a result set having a plurality of rows of data from each of the plurality of tables, wherein between a parent table and a child table in the graph, the result set includes a row having parent values from the parent table and child values from one row of the child table such that a result set is generated for each queried record without duplicates, wherein the inline views comprises a query that collectively represents one or more tables to be queried and is generated by recursively generating multiple intermediate inline views, and wherein the final inline view results in the single query statement that provides a single result set;
   querying the relational database using the single query statement to obtain the result set; and
   populating the software object with one or more values of the result set.

2. The system of claim 1, wherein the result set includes, for subsequent rows of child values having the same parent values in the relational database, null values for each of the parent values.

3. The system of claim 1, wherein the single query statement causes the database management system to retrieve each row from each relevant table exactly once.

4. The system of claim 1, wherein generating the single query statement comprises performing a plurality of iterations to build the query, wherein on each iteration a query statement generated for a child table is referenced by a query statement generated for a parent table.

5. The system of claim 4, wherein each iteration generates a new inline view representing merged values from the parent table and the child table.

6. The system of claim 4, wherein performing the plurality of iterations comprises iterating from child nodes in the graph to a root node of the graph.

7. The system of claim 1, wherein the single query statement causes the database management system to generate artificial columns having values that distinguish child rows that reference a same parent row.

8. The system of claim 1,
   wherein one or more tables of the plurality of tables store references to other tables of the plurality of tables,
   wherein the graph comprises nodes and edges, wherein each node represents a table of the plurality of tables and each edge linking a respective pair of nodes represents a reference of a first table represented by a first node of the pair of nodes stored by a second table represented by a second node of the pair of nodes, and
   wherein generating the single query statement comprises generating a inline view from the graph, wherein the inline view represents each table of the plurality of tables represented in the graph, and wherein querying the relational database using the single query statement causes the database management system to generate the result set from the inline view.

9. A method performed by one or more computers, the method comprising:
   receiving a request to populate a software object with values from a plurality of tables represented in a graph, the plurality of tables stored in a relational database maintained by a database management system, each table comprising one or more respective tuples of values;
   using analytic functions, full outer joins, and inline views to recursively generate a single query statement such that, when executed by the database management system, the single query statement causes the database management system to retrieve the values from the plurality of tables as a result set having a plurality of rows of data from each of the plurality of tables, wherein between a parent table and a child table in the graph, the result set includes a row having parent values from the parent table and child values from one row of the child table such that a result set is generated for each queried record without duplicates, wherein the inline views comprises a query that collectively represents one or more tables to be queried and is generated by recursively generating multiple intermediate inline views, and wherein the final inline view results in the single query statement that provides a single result set;
   querying the relational database using the single query statement to obtain the result set; and
   populating the software object with one or more values of the result set.

10. The method of claim 9, wherein the result set includes, for subsequent rows of child values having the same parent values in the relational database, null values for each of the parent values.

11. The method of claim 9, wherein the single query statement causes the database management system to retrieve each row from each relevant table exactly once.

12. The method of claim 9, wherein generating the single query statement comprises performing a plurality of iterations to build the query, wherein on each iteration a query statement generated for a child table is referenced by a query statement generated for a parent table.

13. The method of claim 12, wherein each iteration generates a new inline view representing merged values from the parent table and the child table.

14. The method of claim 12, wherein performing the plurality of iterations comprises iterating from child nodes in the graph to a root node of the graph.

15. The method of claim 9, wherein the single query statement causes the database management system to generate artificial columns having values that distinguish child rows that reference a same parent row.

16. The method of claim 9,
wherein one or more tables of the plurality of tables store references to other tables of the plurality of tables,
wherein the graph comprises nodes and edges, wherein each node represents a table of the plurality of tables and each edge linking a respective pair of nodes represents a reference of a first table represented by a first node of the pair of nodes stored by a second table represented by a second node of the pair of nodes, and
wherein generating the single query statement comprises generating a inline view from the graph, wherein the inline view represents each table of the plurality of tables represented in the graph, and wherein querying the relational database using the single query statement causes the database management system to generate the result set from the inline view.

17. One or more non-transitory computer storage media encoded with computer program instructions that when executed by one or more computers cause the one or more computers to perform operations comprising:
receiving a request to populate a software object with values from a plurality of tables represented in a graph, the plurality of tables stored in a relational database maintained by a database management system, each table comprising one or more respective tuples of values;
using analytic functions, full outer joins, and inline views to recursively generate a single query statement such that, when executed by the database management system, the single query statement causes the database management system to retrieve the values from the plurality of tables as a result set having a plurality of rows of data from each of the plurality of tables, wherein between a parent table and a child table in the graph, the result set includes a row having parent values from the parent table and child values from one row of the child table such that a result set is generated for each queried record without duplicates, wherein the inline views comprises a query that collectively represents one or more tables to be queried and is generated by recursively generating multiple intermediate inline views, and wherein the final inline view results in the single query statement that provides a single result set;
querying the relational database using the single query statement to obtain the result set; and
populating the software object with one or more values of the result set.

18. The one or more non-transitory computer storage media of claim 17, wherein the result set includes, for subsequent rows of child values having the same parent values in the relational database, null values for each of the parent values.

19. The one or more non-transitory computer storage media of claim 17, wherein the single query statement causes the database management system to retrieve each row from each relevant table exactly once.

20. The one or more non-transitory computer storage media of claim 17, wherein generating the single query statement comprises performing a plurality of iterations to build the query, wherein on each iteration a query statement generated for a child table is referenced by a query statement generated for a parent table.

* * * * *